(12) United States Patent
Hirsch et al.

(10) Patent No.: US 7,632,334 B2
(45) Date of Patent: *Dec. 15, 2009

(54) METHOD AND PLANT FOR THE HEAT TREATMENT OF SOLIDS CONTAINING IRON OXIDE

(75) Inventors: Martin Hirsch, Friedrichsdorf (DE); Michael Ströder, Neu-Anspach (DE); Peter Weber, Kronberg-Schönberg (DE)

(73) Assignee: Outotec OYJ, Epsoo (FI)

( * ) Notice: Subject to any disclaimer, the term of this patent is extended or adjusted under 35 U.S.C. 154(b) by 435 days.

This patent is subject to a terminal disclaimer.

(21) Appl. No.: 10/540,434

(22) PCT Filed: Dec. 12, 2003

(86) PCT No.: PCT/EP03/14106

§ 371 (c)(1),
(2), (4) Date: May 16, 2006

(87) PCT Pub. No.: WO2004/057044

PCT Pub. Date: Jul. 8, 2004

(65) Prior Publication Data

US 2006/0230880 A1    Oct. 19, 2006

(30) Foreign Application Priority Data

Dec. 23, 2002  (DE) ................................ 102 60 731

(51) Int. Cl.
*B01J 8/24* (2006.01)
*C22B 1/10* (2006.01)
*C22B 5/14* (2006.01)

(52) U.S. Cl. .......................... 75/444; 148/630; 266/172

(58) Field of Classification Search ........... 75/444–451, 75/454; 148/630; 266/168, 171, 172; 422/139; 423/148; 432/14–15, 27, 58, 197, 215
See application file for complete search history.

(56) References Cited

U.S. PATENT DOCUMENTS 2,485,317 A    10/1949   Roetheli (Continued)

FOREIGN PATENT DOCUMENTS

AU        9894057 A1    5/2000

(Continued)

OTHER PUBLICATIONS

Y. T. Kim et al, Entrainment of solids in an internally circulating fluidized bed with draft tube. Chemical Engineering Journal, vol. 66, (1997), p. 105-110.*

(Continued)

*Primary Examiner*—George Wyszomierski
*Assistant Examiner*—Mark L Shevin
(74) *Attorney, Agent, or Firm*—Darby & Darby

(57) ABSTRACT

A method for the heat treatment of solids containing iron oxide, in which fine-grained solids are heated to a temperature of about 630° C. in a fluidized-bed reactor (1). To improve the utilization of energy, it is proposed to introduce a first gas or gas mixture from below through a supply tube (3) into a mixing chamber (7) of the reactor (1), the gas supply tube (3) being at least partly surrounded by a stationary annular fluidized bed (10) which is fluidized by supplying fluidizing gas. The gas velocities of the first gas or gas mixture and of the fluidizing gas for the annular fluidized bet (10) are adjusted such that the Particle-Froude-Numbers in the gas supply tube (3) are between 1 and 100, in the annular fluidized bed (10) between 0.02 and 2, and in the mixing chamber (7) between 0.3 and 30.

10 Claims, 2 Drawing Sheets

U.S. PATENT DOCUMENTS

| | | | |
|---|---|---|---|
| 2,582,170 A | 1/1952 | Shen | |
| 2,582,710 A | 1/1952 | Martin | |
| 2,607,666 A | 8/1952 | Martin | |
| 2,714,126 A | 7/1955 | Keith | |
| 2,826,460 A | 3/1958 | Cameron et al. | |
| 2,864,674 A | 12/1958 | King | |
| 2,874,095 A | 2/1959 | Boisture et al. | |
| 2,901,421 A | 8/1959 | Bourguet et al. | |
| 3,528,179 A | 9/1970 | Smith | |
| 3,565,408 A | 2/1971 | Reh et al. | |
| 3,578,798 A * | 5/1971 | Lapple et al. | 432/58 |
| 3,671,424 A | 6/1972 | Saxton | |
| 3,876,392 A | 4/1975 | Kalina et al. | |
| 3,884,620 A | 5/1975 | Rammler | |
| 3,995,987 A | 12/1976 | MacAskill | |
| 4,044,094 A | 8/1977 | Barner et al. | |
| 4,073,642 A | 2/1978 | Collin et al. | |
| 4,080,437 A | 3/1978 | Reh et al. | |
| 4,091,085 A | 5/1978 | Reh et al. | |
| 4,191,544 A | 3/1980 | Boll et al. | |
| 4,338,283 A | 7/1982 | Sakamoto et al. | |
| 4,377,466 A | 3/1983 | Wallman | |
| 4,402,754 A | 9/1983 | Schmidt et al. | |
| 4,404,755 A | 9/1983 | Stewart et al. | |
| 4,490,287 A | 12/1984 | Hardwick et al. | |
| 4,545,132 A | 10/1985 | Li et al. | |
| 4,555,388 A | 11/1985 | Hundebol | |
| 4,676,824 A | 6/1987 | Daradimos et al. | |
| 4,716,856 A | 1/1988 | Beisswenger et al. | |
| 4,786,477 A | 11/1988 | Yoon et al. | |
| 4,789,580 A | 12/1988 | Hirsch et al. | |
| 4,795,547 A | 1/1989 | Barnes | |
| 4,806,158 A | 2/1989 | Hirsch et al. | |
| 4,817,563 A | 4/1989 | Beisswenger et al. | |
| 4,822,592 A | 4/1989 | Misra | |
| 4,919,715 A | 4/1990 | Smith et al. | |
| 4,992,245 A | 2/1991 | Van Slooten et al. | |
| 5,033,413 A | 7/1991 | Zenz et al. | |
| 5,205,350 A | 4/1993 | Hirsch et al. | |
| 5,269,236 A | 12/1993 | Okuno et al. | |
| 5,349,154 A | 9/1994 | Harker et al. | |
| 5,374,413 A | 12/1994 | Kim et al. | |
| 5,382,412 A | 1/1995 | Kim et al. | |
| 5,382,418 A | 1/1995 | Thone et al. | |
| 5,437,850 A | 8/1995 | Kroehl et al. | |
| 5,505,907 A * | 4/1996 | Hiltunen et al. | 422/146 |
| 5,527,379 A * | 6/1996 | Hirsch et al. | 75/436 |
| 5,560,762 A | 10/1996 | Bresser et al. | |
| 5,573,689 A | 11/1996 | Fukuoka et al. | |
| 5,603,748 A | 2/1997 | Hirsch et al. | |
| 5,783,158 A | 7/1998 | Tacke et al. | |
| 5,942,110 A | 8/1999 | Norris | |
| 6,007,869 A | 12/1999 | Schreieder et al. | |
| 6,015,539 A | 1/2000 | Schmidt et al. | |
| 6,022,513 A | 2/2000 | Pecoraro et al. | |
| 6,074,533 A | 6/2000 | Tranquilla | |
| 6,110,413 A | 8/2000 | Jung et al. | |
| 6,197,234 B1 | 3/2001 | Goudmand et al. | |
| 6,368,389 B1 | 4/2002 | Birke et al. | |
| 6,395,248 B1 | 5/2002 | Kim et al. | |
| 6,413,477 B1 | 7/2002 | Govoni et al. | |
| 6,416,721 B1 | 7/2002 | Sanjurjo et al. | |
| 6,827,786 B2 | 12/2004 | Lord | |
| 6,830,597 B1 | 12/2004 | Green | |
| 7,526,923 B2 | 5/2009 | Lothe | |
| 2006/0162500 A1 | 7/2006 | Nuber et al. | |
| 2006/0230879 A1 | 10/2006 | Stroder et al. | |
| 2006/0230880 A1 | 10/2006 | Hirsch et al. | |
| 2006/0231433 A1 | 10/2006 | Rufo, Jr. et al. | |
| 2006/0231466 A1 | 10/2006 | Nuber | |
| 2006/0249100 A1 | 11/2006 | Freytag et al. | |
| 2006/0263292 A1 | 11/2006 | Hirsch et al. | |
| 2006/0278566 A1 | 12/2006 | Orth et al. | |
| 2007/0137435 A1 | 6/2007 | Orth et al. | |

FOREIGN PATENT DOCUMENTS

| | | |
|---|---|---|
| CN | 1732276 A | 2/2006 |
| CN | 1738918 A | 2/2006 |
| DE | 1 016 938 | 10/1957 |
| DE | 2805906 | 8/1979 |
| DE | 3235559 | 5/1984 |
| DE | 2524541 | 8/1986 |
| DE | 2624302 | 4/1987 |
| DE | 248 109 | 7/1987 |
| DE | 3822999 | 1/1990 |
| DE | 278 348 | 5/1990 |
| DE | 40 15031 | 11/1991 |
| DE | 41 03 965 | 4/1992 |
| DE | 4206602 | 6/1993 |
| DE | 44 10 093 | 3/1995 |
| DE | 196 09284 | 9/1997 |
| DE | 19841513 | 5/1999 |
| DE | 198 13 286 A1 | 9/1999 |
| DE | 694 16458 | 9/1999 |
| DE | 694 17103 | 9/1999 |
| DE | 1010157 | 8/2002 |
| DE | 10061386 | 9/2002 |
| DE | 10164086 | 8/2003 |
| EP | 0 630 975 | 12/1984 |
| EP | 0 246 191 | 11/1987 |
| EP | 0534243 | 3/1993 |
| EP | 0 575 245 | 12/1993 |
| EP | 0630 683 | 12/1994 |
| EP | 0748391 | 12/1996 |
| EP | 0995065 | 4/2000 |
| GB | 915412 | 1/1963 |
| GB | 915412 | 3/1964 |
| GB | 951245 | 3/1964 |
| GB | 1 502 576 | 3/1978 |
| WO | 89/09290 | 10/1989 |
| WO | WO 90/11824 | 10/1990 |
| WO | 98/08989 | 3/1998 |
| WO | 01/44719 | 6/2001 |
| WO | 02/055744 | 7/2002 |
| WO | WO-2004056465 | 7/2004 |
| WO | WO-2004056467 | 7/2004 |

OTHER PUBLICATIONS

U.S. Appl. No. 10/540,436, filed Nov. 10, 2005, Dirk Nuber et al.
U.S. Appl. No. 10/540,438, filed Jun. 6, 2006, Jochen Freytag et al.
U.S. Appl. No. 10/540,437, filed May 10, 2006, Michael Ströder et al.
U.S. Appl. No. 10/540,435, filed Mar. 27, 2006, Andreas Orth et al.
U.S. Appl. No. 10/540,376, filed Jan. 17, 2006, Dirk Nuber et al.
U.S. Appl. No. 10/540,073, filed Jul. 19, 2006, Andreas Orth et al.
U.S. Appl. No. 10/540,497, filed May 31, 2006, Michael Ströder et al.
U.S. Appl. No. 10/540,352, filed Mar. 24, 2006, Michael Ströder et al.
U.S. Appl. No. 10/540,071, filed May 11, 2006, Martin Hirsch et al.
Vijay, "Preoxidation and Hydrogen Reduction of Ilmenite in a Fluidized Bed Reactor" XP 000632260, *Metallurgical and Materials Transactions B*, vol. 27B, Oct. 1996 pp. 731-738.
Eurasian Patent Office, Office Action dated Jun. 22, 2006, for Application No. 200501030/27.
English abstract of EPO Application No. 0 630975, Dec. 28, 1984.
English abstract of German Application No. 44 10 093, Mar. 9, 1995.

* cited by examiner

METHOD AND PLANT FOR THE HEAT TREATMENT OF SOLIDS CONTAINING IRON OXIDE

This application claims the benefit of International Application No. PCT/EP2003/014106 filed on Dec. 12, 2003 under 35 U.S.C. §371, entitled, "Method and Plant for the Heat Treatment of Solids Containing Iron Oxide" which claims the benefit of German Patent Application No. 102 60 731.1 filed on Dec. 23, 2002.

TECHNICAL FIELD

The present invention relates to a method for the in particular reductive heat treatment of solids containing iron oxide, in which fine-grained solids are heated to a temperature of about 630° C. in a fluidized-bed reactor, and to a corresponding plant.

Such method and a plant are known for instance from DE 44 10 093 C1, in order to reduce iron-oxide-containing solids such as iron ores, iron ore concentrates or the like. For this purpose, iron-oxide-containing ore is introduced into the fluidized-bed reactor and fluidized with heated reduction gas. The solids are entrained by the gas stream and separated from the exhaust gas in a downstream separator, in order to be recirculated to the reactor. For further processing, solids are withdrawn from the lower region of the reactor.

However, this direct reduction in the fluidized-bed reactor involves the risk that above the distributor grid (gas distributor), which is typically used for distributing the reduction gas, excess temperatures are obtained, as the reduction gas has a high temperature for heating the solids. At the same time, the mass and heat transfer conditions are regarded as unsatisfactory due to the only limited solids retention time of e.g. 20 minutes and the only moderate relative velocities between gas and solids. Due to the additional introduction of exhaust gases of a downstream reduction stage into the reactor, the reactor must have a complicated design, for instance with a diameter reduced by about 30% in the vicinity of the exhaust gas inlet. In addition, the gas supply conduits are gated at an angle, in order to prevent a clogging of the conduit to which dust-laden (secondary) gas is admitted, and to allow that solids which have entered the conduit fall back into the reactor.

DESCRIPTION OF THE INVENTION

Therefore, it is the object of the present invention to improve the conditions for a mass and heat transfer during the heat treatment of solids containing iron oxide.

In accordance with the invention, this object is solved by a method as mentioned above, in which a first gas or gas mixture is introduced from below through at least one preferably centrally arranged gas supply tube (central tube) into a mixing chamber region of the reactor, the central tube being at least partly surrounded by a stationary annular fluidized bed which is fluidized by supplying fluidizing gas, and in which the gas velocities of the first gas or gas mixture as well as of the fluidizing gas for the annular fluidized bed are adjusted such that the Particle-Froude-Numbers in the central tube are between 1 and 100, in the annular fluidized bed between 0.02 and 2 and in the mixing chamber between 0.3 and 30.

In the method of the invention, the advantages of a stationary fluidized bed, such as a sufficiently long solids retention time, and the advantages of a circulating fluidized bed, such as a good mass and heat transfer, can surprisingly be combined with each other during the heat treatment, while the disadvantages of both systems are avoided. When passing through the upper region of the central tube, the first gas or gas mixture entrains solids from the annular stationary fluidized bed, which is referred to as annular fluidized bed, into the mixing chamber, so that due to the high slip velocities between the solids and the first gas an intensively mixed suspension is formed and an optimum mass and heat transfer between the two phases is achieved. By correspondingly adjusting the bed height in the annular fluidized bed as well as the gas velocities of the first gas or gas mixture and of the fluidizing gas, the solids loading of the suspension above the orifice region of the central tube can be varied within wide ranges, so that the pressure loss of the first gas between the orifice region of the central tube and the upper outlet of the mixing chamber can be between 1 mbar and 100 mbar. In the case of a high solids loading of the suspension in the mixing chamber, a large part of the solids will separate out of the suspension and fall back into the annular fluidized bed. This recirculation is called internal solids recirculation, the stream of solids circulating in this internal circulation normally being significantly larger than the amount of solids supplied to the reactor from outside. The (smaller) amount of not precipitated solids is discharged from the mixing chamber together with the first gas or gas mixture. The retention time of the solids in the reactor can be varied within a wide range by the selection of height and cross-sectional area of the annular fluidized bed and be adapted to the desired heat treatment. Due to the high solids loading on the one hand and the good mass and heat transfer on the other hand, the formation of local temperature peaks in the mixing chamber can be avoided. The amount of solids entrained from the reactor with the gas stream is completely or at least partly recirculated to the reactor, with the recirculation expediently being fed into the stationary fluidized bed. The stream of solid matter thus recirculated to the annular fluidized bed normally lies in the same order of magnitude as the stream of solid matter supplied to the reactor from outside. Apart from the excellent utilization of the reduction gas, another advantage of the method in accordance with the invention consists in the possibility of quickly, easily and reliably adjusting the utilization of the reduction gas and the mass transfer to the requirements by changing the flow velocities of the first gas or gas mixture and of the fluidizing gas. Furthermore, the construction of the reactor can be simplified such that the same for instance has a cylindrical shape.

To ensure a particularly effective heat transfer in the mixing chamber and a sufficient retention time in the reactor, the gas velocities of the first gas mixture and of the fluidizing gas are preferably adjusted for the fluidized bed such that the dimensionless Particle-Froude-Numbers ($Fr_p$) in the central tube are 1.15 to 20, in particular about 10.6, in the annular fluidized bed 0.115 to 1.15, in particular about 0.28, and/or in the mixing chamber 0.37 to 3.7, in particular about 1.1. The Particle-Froude-Numbers are each defined by the following equation:

$$Fr_P = \frac{u}{\sqrt{\frac{(\rho_s - \rho_f)}{\rho_f} * d_p * g}}$$

with
u=effective velocity of the gas flow in m/s
$\rho_s$=density of a solid particle in kg/m³
$\rho_f$=effective density of the fluidizing gas in kg/m³

$d_p$ = mean diameter in m of the particles of the reactor inventory (or the particles formed) during operation of the reactor g = gravitational constant in m/s².

When using this equation it should be considered that $d_p$ does not indicate the mean diameter ($d_{50}$) of the material used, but the mean diameter of the reactor inventory formed during the operation of the reactor, which can differ significantly from the mean diameter of the material used (primary particles). Even from very fine-grained material with a mean diameter of e.g. 3 to 10 μm, particles (secondary particles) with a mean diameter of 20 to 30 μm can be formed for instance during the heat treatment. On the other hand, some materials, e.g. ores, are decrepitated during the heat treatment.

In accordance with a development of the invention it is proposed to adjust the bed height of solids in the reactor such that the annular fluidized bed at least partly extends beyond the upper orifice end of the central tube by a few centimeters, and thus solids are constantly introduced into the first gas or gas mixture and entrained by the gas stream to the mixing chamber located above the orifice region of the central tube. In this way, there is achieved a particularly high solids loading of the suspension above the orifice region of the central tube, which improves the transfer conditions between gas and solids.

By means of the method in accordance with the invention all kinds of iron-oxide-containing ores, in particular iron ores or iron ore concentrates, can effectively be heat-treated.

The generation of the amount of heat necessary for the operation of the reactor can be effected in any way known to the expert for this purpose.

In accordance with a particular embodiment of the invention it is provided to supply preheated reduction gas to the reactor for fluidization, which reduces the possibly likewise preheated solids. The reactor temperature for instance lies below the temperature of the mass flows entering the reactor. As reduction gas, gas with a hydrogen content of at least 80%, preferably above 90%, is particularly useful.

The consumption of fresh reduction gas can be decreased considerably when the reduction gas is cleaned in a reprocessing stage downstream of the reactor and subsequently recirculated to the reactor. During reprocessing, the gas is first separated from solids, possibly passed through a scrubber and cooled below the dew point of steam, so that the steam content can be reduced, then compressed and enriched with fresh hydrogen.

In accordance with a development of the invention it is proposed to cover part of the energy demand of the reactor by supplying exhaust gases from a downstream reactor, for instance another reduction reactor, which possibly still contains reduction gas. Thus, the necessary demand of fresh reduction gas and fuel can be decreased distinctly. Preferably, the exhaust gas is supplied to the reactor via the central tube, while processed reduction gas is expediently introduced as fluidizing gas into the annular fluidized bed through a conduit.

A plant in accordance with the invention, which is in particular suited for performing the method described above, has a reactor constituting a fluidized-bed reactor for the in particular reductive heat treatment of solids containing iron oxide, the reactor having a gas supply system which is formed such that gas flowing through the gas supply system entrains solids from a stationary annular fluidized bed, which at least partly surrounds the gas supply system, into the mixing chamber. Preferably, this gas supply system extends into the mixing chamber. It is, however, also possible to let the gas supply system end below the surface of the annular fluidized bed. The gas is then introduced into the annular fluidized bed e.g. via lateral apertures, entraining solids from the annular fluidized bed into the mixing chamber due to its flow velocity.

In accordance with a preferred aspect of the invention, the gas supply system has a central tube extending upwards substantially vertically from the lower region of the reactor into the mixing chamber of the reactor, which central tube is at least partly surrounded by a chamber in which the stationary annular fluidized bed is formed. The annular fluidized bed need not be circular, but rather other shapes of the annular fluidized bed are also possible in dependence on the geometry of the central tube and of the reactor, as long as the central tube is at least partly surrounded by the annular fluidized bed. Of course, two or more central tubes with different or the same dimensions can also be provided in the reactor. Preferably, however, at least one of the central tubes is arranged approximately centrally, based on the cross-sectional area of the reactor.

In accordance with another embodiment of the present invention, the central tube has apertures, for instance in the form of slots, at its shell surface, so that during the operation of the reactor solids constantly get into the central tube through the apertures and are entrained by the first gas or gas mixture from the central tube into the mixing chamber.

In accordance with a preferred embodiment, a separator, for instance a cyclone for separating solids is provided downstream of the reactor, the separator having a solids conduit which leads to the annular fluidized bed of the first reactor.

To provide for a reliable fluidization of the solids and the formation of a stationary fluidized bed, a gas distributor is provided in the annular chamber of the reactor, which divides the chamber into an upper fluidized bed region and a lower gas distributor chamber. The gas distributor chamber is connected with a supply conduit for fluidizing gas. Instead of the gas distributor chamber, there can also be used a gas distributor composed of tubes.

The energy demand of the plant can be reduced in that the reactor has a supply conduit for hydrogen-containing reduction gas, which leads to the central tube and is connected for instance with the exhaust gas outlet of a separator of another reactor provided downstream of the reactor. Alternatively or in addition, a supply conduit for preheated hydrogen-containing reduction gas, which extends in or leads to the annular chamber, may be provided in the plant in accordance with the invention.

To not exceed the technically manageable maximum temperatures of the gases used in the plant, the energy required for the heat treatment should preferably not exclusively be introduced into the reactor via the gases. For this purpose, a preheating stage for the solids may be provided upstream of the reactor, so that already preheated solids are introduced into the reactor. Preferably, the temperature of the solids charged into the reactor lies above the reactor temperature.

In the annular fluidized bed and/or the mixing chamber of the reactor, means for deflecting the solid and/or fluid flows may be provided in accordance with the invention. It is for instance possible to position an annular weir, whose diameter lies between that of the central tube and that of the reactor wall, in the annular fluidized bed such that the upper edge of the weir protrudes beyond the solids level obtained during operation, whereas the lower edge of the weir is arranged at a distance from the gas distributor or the like. Thus, solids separated out of the mixing chamber in the vicinity of the reactor wall must first pass by the weir at the lower edge thereof, before they can be entrained by the gas flow of the central tube back into the mixing chamber. In this way, an exchange of solids is enforced in the annular fluidized bed, so that a more uniform retention time of the solids in the annular fluidized bed is obtained.

The invention will subsequently be described in detail with reference to an embodiment and the drawing. All features described and/or illustrated in the drawing form the subject-matter of the invention per se or in any combination, independent of their inclusion in the claims or their back-reference.

DETAILED DESCRIPTION OF THE PREFERRED EMBODIMENTS

Figure 1:
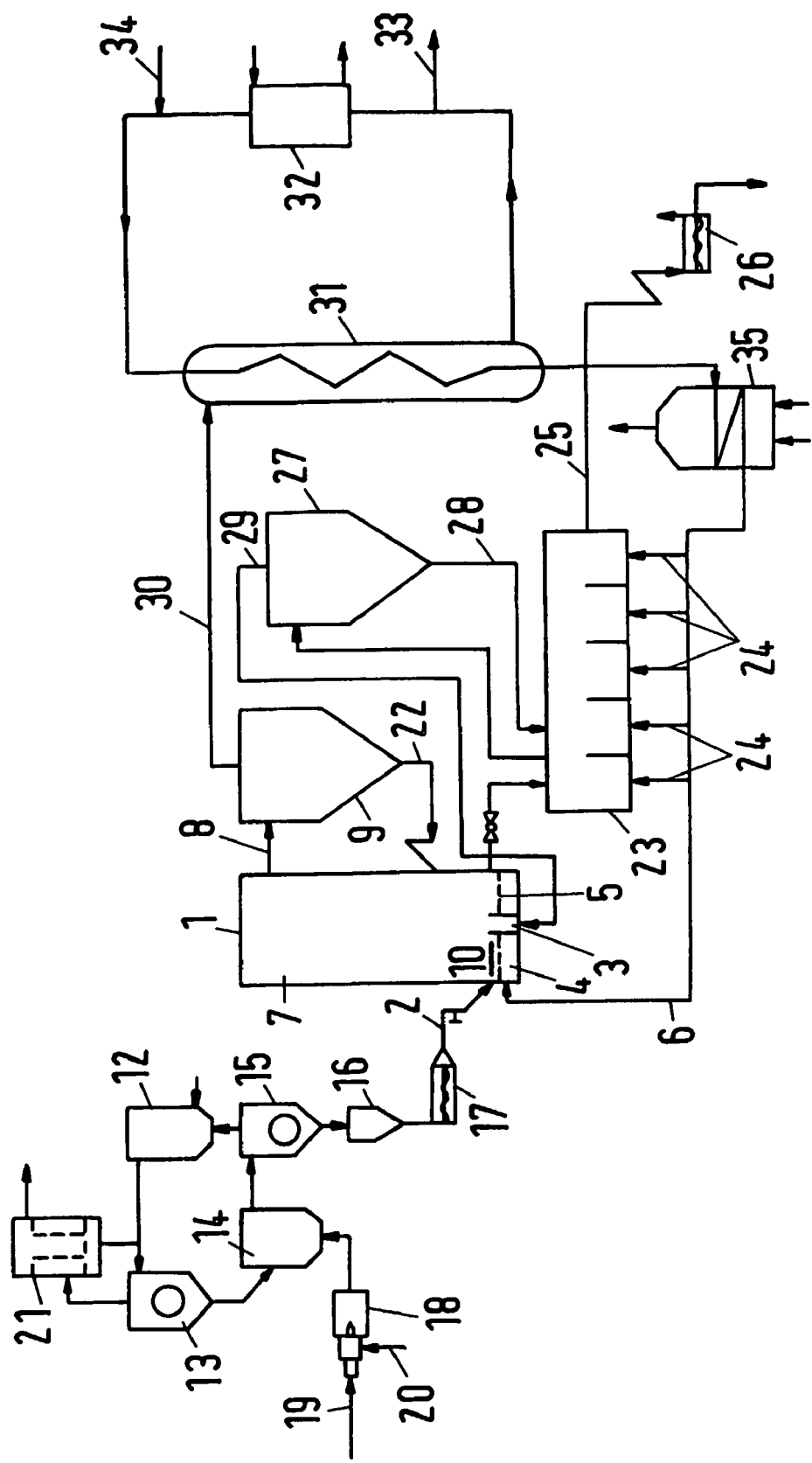
FIG. 1 shows a process diagram of a method and a plant in accordance with an embodiment of the present invention.
Figure 2:
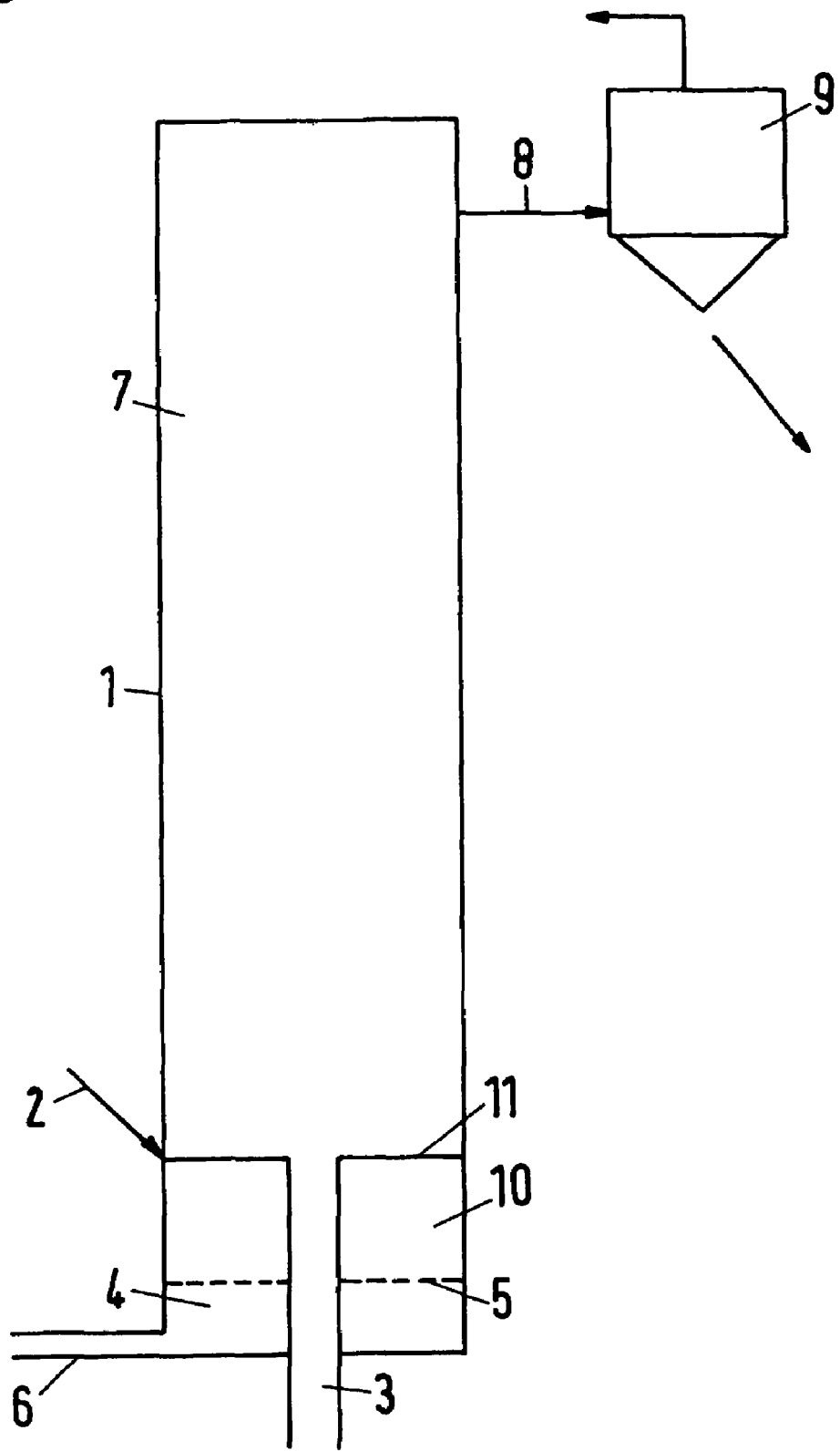
FIG. 2 shows an enlarged detail of FIG. 1.

In the method shown in FIG. 1, which is in particular suited for the heat treatment of solids containing iron oxide, solids are introduced into a reactor 1 via a supply conduit 2, as can be seen in the enlarged representation of FIG. 2. The for instance cylindrical reactor 1 has a central tube 3 arranged approximately coaxially with the longitudinal axis of the reactor, which central tube extends substantially vertically upwards from the bottom of the reactor 1.

In the vicinity of the bottom of the reactor 1, an annular gas distributor chamber 4 is provided, which at its upper end is terminated by a gas distributor 5 having through openings. A supply conduit 6 opens into the gas distributor chamber 4.

In the vertically upper region of the reactor 1, which forms a mixing chamber 7, a discharge conduit 8 is arranged, which opens into a separator 9 constituting a cyclone.

When solids are now introduced into the reactor 1 via the supply conduit 2, a layer annularly surrounding the central tube 3 is formed on the gas distributor 5, which layer is referred to as annular fluidized bed 10. Fluidizing gas introduced into the gas distributor chamber 4 through the supply conduit 6 flows through the gas distributor 5 and fluidizes the annular fluidized bed 10, so that a stationary fluidized bed is formed. The velocity of the gases supplied to the reactor 1 via the gas distributor chamber 4 is adjusted such that the Particle-Froude-Number in the annular fluidized bed 10 is about 0.28.

Due to the supply of more solids into the annular fluidized bed 10, the solids level 11 in the reactor 1 rises to such an extent that solids get into the orifice of the central tube 3. Through the central tube 3, a gas or gas mixture is at the same time introduced into the reactor 1. The velocity of the gas supplied to the reactor 1 preferably is adjusted such that the Particle-Froude-Number in the central tube 3 is about 10.6 and in the mixing chamber 7 about 1.1. Due to these high gas velocities, the gas flowing through the central tube 3 entrains solids from the stationary annular fluidized bed 10 into the mixing chamber 7 when passing through the upper orifice region.

Since the level 11 of the annular fluidized bed 10 is raised above the upper edge of the central tube 3, solids flow over this edge into the central tube 3, whereby an intensively mixed suspension is formed. The upper edge of the central tube 3 can be straight, wavy or serrated, or the shell surface can have lateral inlet openings. As a result of the reduction of the flow velocity due to the expansion of the gas jet and/or by impingement on one of the reactor walls, the entrained solids quickly lose velocity and partly fall back into the annular fluidized bed 10. The amount of non-precipitated solids is discharged from the reactor 1 together with the gas stream via conduit 8. Between the reactor regions of the stationary annular fluidized bed 10 and the mixing chamber 7 a solids circulation is obtained, by means of which a good heat transfer is ensured. Before the further processing, the solids discharged via conduit 8 are separated from the gases or gas mixtures in the cyclone 9.

In accordance with the method shown in FIG. 1, the fine-grained solids such as iron ore are first charged into a preheating stage with a Venturi preheater 12. Downstream of the same a cyclone 13 is provided, in which the solids are separated from exhaust gas. From the cyclone 13, the solids are supplied to another Venturi preheater 14. Downstream of the same, a cyclone 15 is in turn provided, in which the solids are separated from exhaust gas and via a bunker 16 and a screw conveyor 17 are supplied to the reactor 1 via conduit 2.

Hot combustion gases from a combustion chamber 18 are supplied to the Venturi preheater 14 for heating the solids, to which combustion chamber fuel is supplied via conduit 10 and combustion air is supplied via conduit 20. It turned out to be advantageous to operate the combustion at a pressure of 0.8 to 10 bar and preferably at atmospheric pressure. The still hot exhaust gases which were separated from the solids in the cyclone 15 are supplied to the first Venturi preheater 12 for preheating the solids. After the separation of the solids in the cyclone 13, the exhaust gas is cleaned in a filter 21.

In the reactor 1, the solids are subjected to a heat treatment, with heated reducing fluidizing gas being introduced through conduit 6 into the annular fluidized bed 10 formed. At the same time, exhaust gas from another reduction stage downstream of the reactor 1 is supplied through the central tube 3, so that the solids for one part circulate in the reactor 1 in the manner described above and for the other part are discharged from the reactor 1 via conduit 8 and upon separation of the exhaust gas in the cyclone 9 are recirculated to the annular fluidized bed via conduit 22.

From the annular fluidized bed 10, a stream of solids is in addition withdrawn from the reactor 1 and supplied to a downstream fluidized bed reactor 23. The fluidized-bed reactor 23 has a classical fluidized bed, into which heated fluidizing gas is introduced via conduit 24. Via conduit 25, solids are withdrawn from the fluidized-bed reactor 23 and supplied for instance to a briquetting plant 26.

In a cyclone 27, the exhaust gases of the fluidized-bed reactor 23 are separated from solids, which are recirculated to the fluidized-bed reactor 23 via conduit 28. The exhaust gases are supplied from the cyclone 27 via conduit 29 to the central tube 3 of the reactor 1.

The exhaust gases of the reactor 1, which were separated from the solids in the cyclone 9, are supplied to a reprocessing via conduit 30. First of all, the exhaust gases are cooled in a heat exchanger 31 and introduced into a scrubber 32, where the cooled gas is further cooled below the dew point of steam, so that the steam content of the exhaust gas can largely be removed. Via conduit 33, a partial stream of the exhaust gas can be removed from the circuit, to prevent for instance an accumulation of nitrogen in the circulating gas. In the same way, fresh reducing gas can be admixed via conduit 34 for fortification. The cleaned gas is now preheated in the heat exchanger 31 and supplied to a heater 35. The cleaned hot reduction gas is then supplied to the fluidized-bed reactor 23 via conduit 24 and as fluidizing gas via conduit 6 to the reactor 1.

In the following, the invention will be explained by means of an example demonstrating the invention, but not restricting the same.

EXAMPLE (Reduction of iron-oxide-containing iron ore)

In a plant corresponding to FIG. 1, 61.2 t/h moist ore with 7.8% moisture were supplied to the Venturi preheater 12. Into the combustion chamber 18, 1500 Nm³/h natural gas were at the same time introduced via conduit 19 and 21.000 Nm³/h air via conduit 20. By means of the combustion gases from the combustion chamber 18, the moist ores were preheated to 500° C. in the two Venturi preheaters 12 and 14. In the filter 21, 2.6 t/h dust were separated from the exhaust gas of the preheating stage.

To the reactor 1, 54.2 t/h preheated ore were supplied via the screw conveyor 17 and conduit 2, and reducing fluidizing gas containing
 91 vol-% $H_2$,
 0.6 vol-% $H_2O$ and
 8.4 vol-% $N_2$
was supplied via conduit 6. The reduction temperature in the reactor 1, which had a diameter of 3 m, was about 630° C. The pressure at the outlet of the reactor 1 was 4 bar.

From the reactor 1, 40.6 t/h prereduced material with a degree of metallization of 70% were introduced into the fluidized-bed reactor 23. The same had a length of 12 m and a width of 4 m. To the fluidized-bed reactor 23, preheated reducing fluidizing gas containing
 91 vol-% $H_2$,
 0.6 vol-% $H_2O$ and
 8.4 vol-% $N_2$
was supplied via conduit 24.

From the fluidized-bed reactor 23, 36.8 t/h product with a degree of metallization of 92% were introduced via conduit 25 into the briquetting plant 26 and briquetted therein. The product had a carbon content of 0.05 wt-%.

Via conduit 30, 182,000 Nm³/h exhaust gas containing
 79 vol-% $H_2$,
 12 vol-% $H_2O$, and
 9 vol-% $N_2$
were introduced into the heat exchanger 31 and cooled therein to 120° C. In the scrubber 32, the exhaust gas was further cooled to 28° C. Upon admixture of 23,000 Nm³/h fresh gas with a $H_2$ content of 97% via conduit 34, the gas was heated to 520° C. in the heat exchanger 31. After a further heating in the heater 35, 70% of the gas were introduced into the fluidized-bed reactor 23, and the remaining 30% of the gas were introduced into the reactor 1.

| List of reference numerals: |
| --- |
| 1 reactor |
| 2 supply conduit |
| 3 central tube |
| 4 gas distributor chamber |
| 5 gas distributor |
| 6 supply conduit |
| 7 mixing chamber |
| 8 conduit |
| 9 separator |
| 10 annular fluidized bed |
| 11 level of the annular fluidized bed |
| 12 Venturi preheater |
| 13 cyclone |
| 14 Venturi preheater |
| 15 cyclone |
| 16 bunker |
| 17 screw conveyor |
| 18 combustion chamber |
| 19 conduit |
| 20 conduit |
| 21 filter |
| 22 solids return conduit |
| 23 fluidized-bed reactor |

| -continued |
| --- |
| List of reference numerals: |
| 24 conduit |
| 25 conduit |
| 26 briquetting plant |
| 27 cyclone |
| 28 solids return conduit |
| 29 conduit |
| 30 conduit |
| 31 heat exchanger |
| 32 scrubber |
| 33 conduit |
| 34 conduit |
| 35 heater |

The invention claimed is:

1. A method for the heat treatment of solids containing iron oxide, in which fine-grained solids are heated to a temperature of about 450 to 950° C. in a fluidized-bed reactor, comprising introducing the solids into the reactor, introducing a first gas or gas mixture from below through at least one preferably central gas supply tube into a mixing chamber of the reactor located above the upper orifice region of the gas supply tube, the at least one gas supply tube being at least partly surrounded by a stationary annular fluidized bed which is fluidized by supplying fluidizing gas, wherein the gas flowing through the at least one gas supply tube entrains solids from the fluidized bed into the mixing chamber when passing through the upper orifice region of the at least one gas supply tube, and adjusting the gas velocities of the first gas or gas mixture and of the fluidizing gas for the annular fluidized bed such that the Particle-Froude-Numbers in the at least one gas supply tube are between 1 and 100, in the annular fluidized bed between 0.02 and 2, and in the mixing chamber between 0.3 and 30, and removing treated solids from the reactor.

2. The method as claimed in claim 1, wherein the Particle-Froude-Number in the at least one gas supply tube is between 1.15 and 20.

3. The method as claimed in claim 1 wherein the Particle-Froude-Number in the annular fluidized bed is between 0.115 and 1.15.

4. The method as claimed in claim 1, wherein the Particle-Froude-Number in the mixing chamber is between 0.37 and 3.7.

5. The method as claimed in claim 1, wherein the bed height of solids in the reactor is adjusted such that the annular fluidized bed at least partly extends beyond the upper orifice end of the at least one gas supply tube.

6. The method as claimed in claim 1, wherein the solids containing iron oxide are iron-oxide-containing ore.

7. The method as claimed in claim 1, wherein the fluidizing gas introduced into the annular fluidized bed of the reactor is a preheated reduction gas which contains at least 80% hydrogen.

8. The method as claimed in claim 7, wherein the reduction gas is cleaned in a reprocessing stage downstream of the reactor and is subsequently recirculated to the reactor.

9. The method as claimed in claim 1, wherein downstream of the reactor a second fluidized-bed reactor is provided, the exhaust gases from which are separated from solids in a separator and are introduced into the at least one gas supply tube of the reactor.

10. The method as claimed in claim 1, wherein upstream of the reactor at least one preheating stage is provided for heating the solids.

* * * * *